United States Patent
Yotsuya et al.

(10) Patent No.: US 6,328,389 B1
(45) Date of Patent: Dec. 11, 2001

(54) BRAKING FORCE CONTROL DEVICE AND BRAKING FORCE CONTROL METHOD

(75) Inventors: Kouji Yotsuya, Numazu; Hiromi Tanaka, Toyota; Tatsuo Sugitani, Nishikamo-gun, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/655,427

(22) Filed: Sep. 5, 2000

(30) Foreign Application Priority Data

Sep. 3, 2000 (JP) .................................. 11-250771

(51) Int. Cl.$^7$ ................. B60J 13/66; B60J 8/32
(52) U.S. Cl. ..................... 303/113.3; 303/113.1
(58) Field of Search .................... 303/20, 113.1, 303/113.2, 113.4, 155

(56) References Cited

U.S. PATENT DOCUMENTS 6,120,110 * 9/2000 Shimizu ........................... 303/113.4
6,129,423 * 10/2000 Hashimoto ........................ 303/125
6,189,986 * 2/2001 Shimizu et al. .................. 303/155
6,227,629 * 5/2001 Yoshida et al. .................. 303/155
6,238,019 * 5/2001 Okazaki et al. .................. 303/146

FOREIGN PATENT DOCUMENTS 9-272418  10/1997 (JP) .
9-286323  11/1997 (JP) .
9-290743  11/1997 (JP) .

* cited by examiner

Primary Examiner—Christopher P. Schwartz
(74) Attorney, Agent, or Firm—Oliff & Berridge PLC (57) ABSTRACT

A braking force control device and method performs brake assist control. A timer CT begins to count the elapsed time, for example, from when the elevation gradient $\Delta P_{M/C}$ of a master cylinder pressure $P_{M/C}$ becomes equal to or greater than a first threshold value TH2. It is determined that an emergency brake operation is executed, when the master cylinder pressure $P_{M/C}$ becomes equal to or greater than a second threshold value TH1 before a predetermined time has passed, and then the brake assist control starts.

18 Claims, 4 Drawing Sheets

BRAKING FORCE CONTROL DEVICE AND BRAKING FORCE CONTROL METHOD

INCORPORATION BY REFERENCE

The disclosure of Japanese Patent Application No. 11-250771 filed on Sep. 3, 1999, including the specification, drawings and abstract is incorporated herein by reference in its entirety.

BACKGROUND OF THE INVENTION

1. Field of the Invention

The invention relates to a braking force control device and a braking force control method and, more particularly to a braking force control device and a braking force control method for generating a braking force greater than usual, when an emergency brake operation is executed.

2. Description of Related Art

JP(P) 9-290743 discloses a braking force control device capable of executing a brake assist control generating a braking force greater than usual, when the emergency brake operation is executed. In this conventional braking force control device it is determined that the emergency brake operation is executed when the master cylinder pressure becomes equal to or greater than a first threshold value, and the elevation gradient of the master cylinder pressure becomes equal to or greater than a second threshold value. Such a determination method prevents the brake assist control from being initiated improperly by an erroneous determination of an emergency brake operation when, for instance, the brake is operated rapidly quite temporarily, or the brake is operated successively with a large pedal depression force during high speed driving.

In general, the braking device comprises a brake booster having a function to generate a great braking force by assisting the brake operation. The brake booster assists the brake operation by using as a power source, the negative pressure supplied from the engine inlet pipe, for generating a large master cylinder pressure. However, the inlet pipe negative pressure varies according to the engine speed, accelerator opening or other vehicle driving conditions. Consequently, if the inlet pipe negative pressure drops and the negative pressure supplied to the brake booster becomes insufficient, the brake operation can not be assisted sufficiently. Under such condition, when the brake is operated, the start-up of master cylinder pressure may be delayed, compared to the case where enough negative pressure is secured for the brake booster. In this case, when the emergency brake is operated, namely, when the brake pedal is depressed by the driver with a predetermined pedal depression force and a predetermined speed, the master cylinder pressure elevation gradient becomes once equal to or greater than the second threshold value; however, when the master cylinder pressure becomes equal to or greater than the aforementioned first threshold value, the master cylinder pressure elevation gradient might be less than the second threshold value. Therefore, in the emergency brake operation determination by the aforementioned conventional braking force control device, when the brake booster negative pressure lowers, even if the driver executes the emergency brake operation, it may not be determined as an emergency brake operation, and therefore the brake assist control may not be executed.

Moreover, the master cylinder pressure response characteristics to the brake operation are different according to brake systems specifications; including not only the brake booster, but also the wheel cylinder size, oil consumption during the braking operation or the like. Thus, the first threshold value or the second threshold value should be set for each system (each model), deteriorating the universality of the system.

SUMMARY OF THE INVENTION

The invention is made in view of the points mentioned above, and it is an object of the invention to provide a braking force control device that allows for the proper execution of the brake assist control, regardless of the magnitude of the brake booster negative pressure.

A braking force control device according to one aspect of the invention determines the brake operation state to be in a predetermined state if the elevation gradient of brake operation amount becomes equal to or greater than a first predetermined value and, thereafter, the brake operation amount becomes equal to or greater than a second predetermined value within a predetermined time period. A brake assist unit executes the brake assist control to generate a braking force larger than usual in the predetermined brake operation state.

In the braking force control device according to this aspect of the invention, if the negative pressure supplied to the brake booster (booster negative pressure, hereafter) lowers, the brake operation may not be assisted sufficiently. In this case, the start-up of the brake operation amount after the brake operation will be delayed. However, for a constant brake operation, the value finally reached by the brake operation amount becomes substantially constant, regardless of the magnitude of the booster negative pressure. Therefore, according to the invention, the control device determines that the brake operation state is in a predetermined state if the elevation gradient of the brake operation amount becomes equal to or greater than a first predetermined value and, thereafter, the brake operation amount becomes equal to or greater than a second predetermined value within a predetermined time period, allowing for the start of the brake assist control securely, regardless of the magnitude of the booster negative pressure. In this case, the master cylinder pressure, brake pedal stroke, or pedal depression force, can be used as the brake operation amount.

BRIEF DESCRIPTION OF THE DRAWINGS

The foregoing and further objects, features and advantages of the invention will become apparent from the following description with reference to the accompanying drawings in which like numerals refer to like elements and wherein.

DETAILED DESCRIPTION OF PREFERRED EMBODIMENTS

Figure 1:
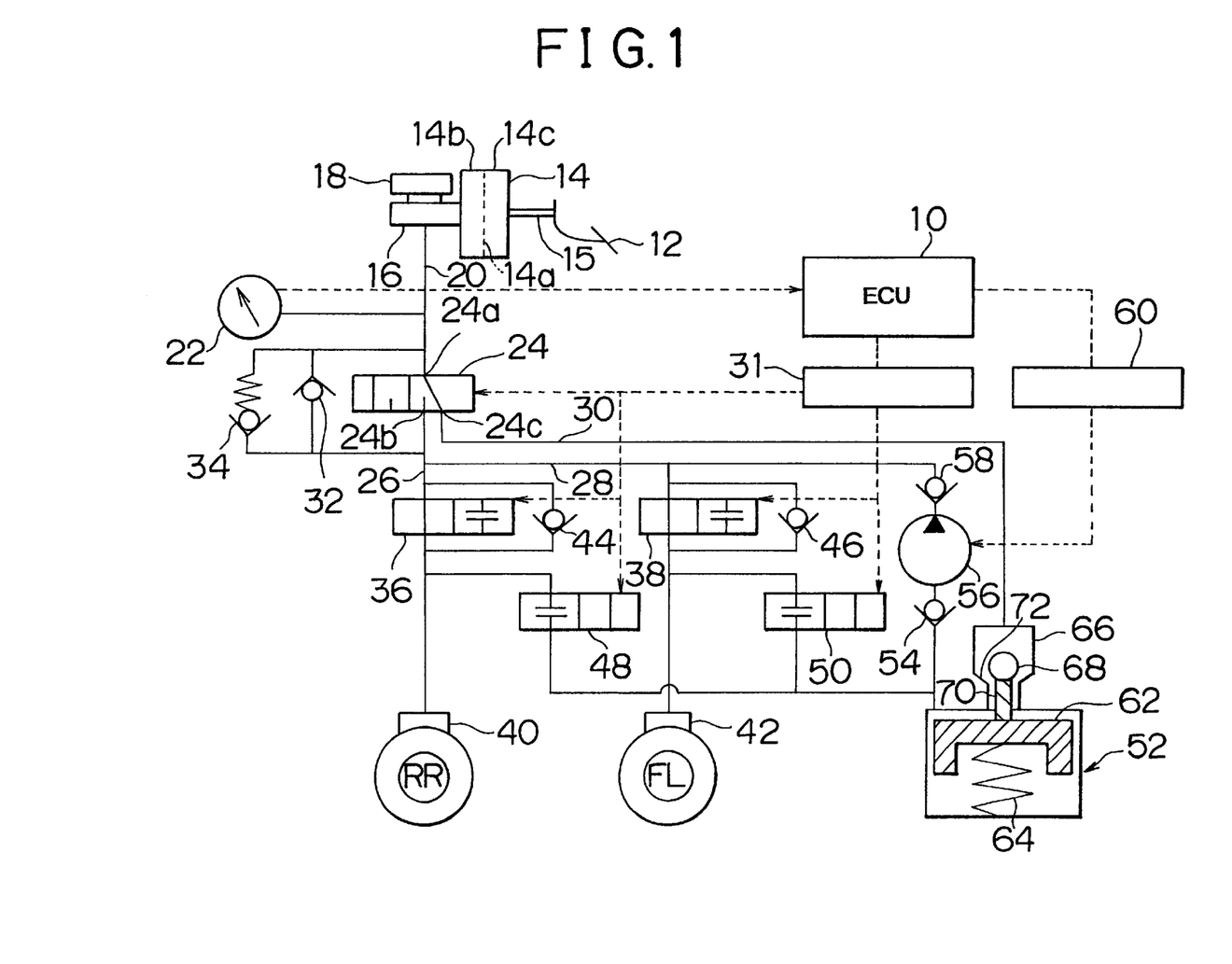
FIG. 1 shows the system configuration of a braking force control device according to an embodiment of the invention.

FIG. 1 shows the system configuration of a braking force control device according to an embodiment of the invention. The hydraulic pressure brake device of this embodiment is controlled by an electronic control unit 10 (ECU, hereafter). FIG. 1 shows components for realizing a brake mechanism for the front left wheel FL and the rear right wheel RR.

The braking force control device shown in FIG. 1 includes a brake pedal 12. The brake pedal 12 is connected to an operation shaft 15 of a brake booster 14. A master cylinder 16 is secured to the brake booster 14.

The brake booster 14 includes, therein, a constant pressure chamber 14b and a variable pressure chamber 14c separated by a diaphragm 14a. The constant pressure chamber 14b is ordinarily supplied with negative pressure from the engine inlet pipe. In this embodiment, the negative pressure in the constant pressure chamber 14b will be referred to as "booster negative pressure." The variable pressure chamber 14c is supplied with negative pressure of the constant pressure chamber 14b when the brake pedal 12 is not depressed. On the other hand, when the brake pedal 12 is depressed, the atmospheric pressure regulated according to such pedal depression force is introduced into the variable pressure chamber 14c. Therefore, a differential pressure corresponding to the pedal depression force is generated between the variable pressure chamber 14c and the constant pressure chamber 14b. This differential pressure generates an assist force with a predetermined boost ratio with respect to the pedal depression force. A master cylinder pressure $P_{M/C}$ corresponding to the resultant of the pedal depression force and the assist force is generated in a hydraulic pressure chamber provided in the master cylinder 16. Thus, the brake booster 14 has a function to assist the brake operation using the booster negative pressure as a power source and to generate a large master cylinder pressure $P_{M/C}$.

A reservoir tank 18 is disposed on the master cylinder 16. The reservoir tank 18 contains therein a predetermined quantity of brake fluid. When the pedal depression force is released, the hydraulic pressure chamber of the master cylinder 16 and the reservoir tank 18 are communicated with each other.

A hydraulic pressure passage 20 is connected to the hydraulic pressure chamber of the master cylinder 16. The hydraulic pressure passage 20 communicates with an oil pressure sensor 22. The output signal of the oil pressure sensor 22 is supplied to the ECU 10. The ECU 10 detects master cylinder pressure $P_{M/C}$ based on the output signal from the oil pressure sensor 22.

An electromagnetic three-way valve 24 is connected to the hydraulic pressure passage 20. The electromagnetic three-way valve 24 is a two-position three-way electromagnetic valve provided with a first port 24a, a second port 24b and a third port 24c. The first port 24a communicates with the hydraulic pressure passage 20, while the second port 24b communicates with hydraulic pressure passages 26 and 28. The third port 24c communicates with a hydraulic pressure passage 30. When it is OFF, the electromagnetic three-way valve 24 conducts between the first port 24a and the second port 24b and, at the same time, closes the third port 24c. On the other hand, when a driving signal is supplied from the ECU 10 via a solenoid relay 31, that is, when it is ON, the electromagnetic three-way valve 24 conducts between the first port 24a and the third port 24c and, at the same time, closes the second port 24b. FIG. 1 shows the ON state of the electromagnetic three-way valve 24.

A check valve 32 and a relief valve 34 are disposed in parallel to the electromagnetic three-way valve 24 between the hydraulic pressure passage 20 and the hydraulic pressure passage 26. The check valve 32 is a one-way valve allowing fluid to flow only from the hydraulic pressure passage 20 side to the hydraulic pressure passage 26 side. The relief valve 34 is a valve mechanism which opens only when the hydraulic pressure passage 26 side hydraulic pressure becomes higher than the hydraulic pressure passage 20 side hydraulic pressure by a value equal to or greater than a predetermined value.

The hydraulic pressure passages 26, 28 communicate with retention solenoids 36, 38. The retention solenoids 36, 38 are two-position electromagnetic valves which are normally open, and close when a driving signal is supplied from the ECU 10 via the solenoid relay 31. The retention solenoids 36, 38 communicate respectively with a wheel cylinder 40 of the rear right wheel RR and with a wheel cylinder 42 of the front left wheel FL. The retention solenoids 36, 38 are respectively provided with a check valves 44, 46 in parallel. The check valves 44, 46 are, respectively, a one-way valve allowing fluid to flow only from the wheel cylinder 40, 42 side to the hydraulic pressure passage 26, 28 side.

The wheel cylinders 40, 42 communicate, respectively, with pressure-reducing solenoids 48, 50. The pressure-reducing solenoids 48, 50 are two-position electromagnetic valves which are normally closed, and open when a driving signal is supplied from the ECU 10 via the solenoid relay 31. Both of the pressure-reducing solenoids 48, 50 communicate with an auxiliary reservoir 52.

The auxiliary reservoir 52 communicates with the inlet side of a pump 56 via a check valve 54. The check valve 54 is a one-way valve allowing fluid to flow only from the auxiliary reservoir 52 side to the pump 56 side. The discharge side of the pump 56 communicates with the hydraulic pressure passage 28 via a check valve 58. The check valve 58 is a one-way valve allowing fluid to flow only from the pump 56 side to the hydraulic pressure passage 28. The pump 56 operates when a driving signal is supplied from the ECU 10 via a pump relay 60 and supplies brake fluid pumped from the auxiliary reservoir 52 to the hydraulic pressure passages 26, 28.

A piston 62 and a spring 64 are disposed in the auxiliary reservoir 52. The piston 62 is biased by the spring 64 in a volume reducing direction of the auxiliary reservoir 52. Consequently, brake fluid accumulated in the auxiliary reservoir 52 generates a predetermined hydraulic pressure. The auxiliary reservoir 52 is provided with a reservoir port 66 communicating with the hydraulic pressure passage 30. A ball valve 68 and a pressing shaft 70 are disposed in the reservoir port 66. Additionally, a seat portion 72 acting as a valve seat of the ball valve 68 is provided in the reservoir port 66. The ends of the pressing shaft 70, respectively, abut against the piston 62 and the ball valve 68.

The piston 62 is placed at the uppermost position (original position, hereafter) in FIG. 1, when brake fluid does not flow into the inside of the auxiliary reservoir 52. A hydraulic pressure passage is secured inside the auxiliary reservoir 52 for securing conduction between the hydraulic pressure passage 30 and the inlet sides of the pressure-reducing solenoids 48, 50 and the check valve 54, when the piston 62 is positioned at its original position.

When the piston 62 is positioned at its original position, the ball valve 68 separates from the seat portion 72. The clearance defined between the ball valve 68 and the seat portion 72 reduces according to the increase of brake fluid quantity accumulated in the auxiliary reservoir 52, namely, according to the increase of displacement amount of the piston 62. When the brake fluid quantity accumulated in the auxiliary reservoir 52 reaches a predetermined value, the ball valve 68 comes into contact with the seat portion 72. While the ball valve 68 is in contact with the seat portion 72, the brake fluid is prevented from flowing into the auxiliary reservoir 52 from the hydraulic pressure passage 30.

The braking force control device shown in FIG. 1 realizes a normal brake control generating a braking amount corresponding to the brake operation amount by the driver, and a brake assist control (BA control, hereafter) generating a larger braking force than usual, when the emergency brake operation is executed by the driver. In addition to the normal brake control and brake assist function, the braking force control device shown in FIG. 1 can also realize the anti-lock brake (ABS) control by turning OFF the electromagnetic two-way valve 24, running the pump 56 and, also, opening/closing properly the retention solenoids 36, 38, and, the pressure-reducing solenoids 48, 50.

The normal brake control is realized by turning OFF the electromagnetic three-way valve 24, opening the retention solenoids 36, 38, closing the pressure-reducing solenoids 48, 50, and stopping the pump 56. This state will be referred to as "normal brake state" hereafter.

When the normal brake state is realized, the master cylinder 16 and the wheel cylinders 40, 42 are connected to each other. In this case, the wheel cylinder pressure $P_{W/C}$ of the wheel cylinders 40, 42 is controlled to a hydraulic pressure equal to the master cylinder pressure $P_{M/C}$. Consequently, when the normal brake state is realized, the braking force acting on a vehicle is controlled to a magnitude corresponding to the pedal depression force.

The BA (brake assist) control is realized by turning ON the electromagnetic three-way valve 24, opening the retention solenoids 36, 38, closing the pressure-reducing solenoids 48, 50, and running the pump 56, as shown in FIG. 1, when it is determined, by a method described below, that the emergency brake operation has been executed. This state will be referred to as "BA state" hereafter.

If the electromagnetic three-way valve 24 is turned ON, the master cylinder 16 and the auxiliary reservoir 52 are connected to each other. Once the master cylinder 16 and the auxiliary reservoir 52 are interconnected, thereafter, brake fluid flows from the master cylinder 16 into the auxiliary reservoir 52, until the ball valve 68 comes into contact with the seat portion 72. Brake fluid that flows into the auxiliary reservoir 52 is pumped up by the pump 56 and delivered to the hydraulic pressure passage 26 under pressure. Therefore, when the BA control is started, high pressure brake fluid is introduced into the hydraulic pressure passages 26, 28 using the pump 56 as a hydraulic pressure source.

High pressure brake fluid introduced into the hydraulic pressure passages 26, 28 during the execution of the BA control is introduced respectively to the wheel cylinders 40, 42 through the retention solenoids 36, 38. Therefore, when the BA control is started, the wheel cylinder pressure $P_{W/C}$ increases immediately to a hydraulic pressure higher than the master cylinder pressure $P_{M/C}$. Thus, according to the BA control, the braking force can be started up immediately, after the emergency brake operation is started.

When an immediate start-up of the braking force is required, the driver depresses the brake pedal 12 rapidly, and, with a large pedal depression force. If such a brake operation is executed, the master cylinder pressure $P_{M/C}$ increases to a high pressure with a rapid gradient. Therefore, as in the prior art mentioned above, when the master cylinder pressure $P_{M/C}$ becomes equal to or greater than a predetermined value, and the elevation gradient of the master cylinder pressure $P_{M/C}$ becomes equal to or greater than a predetermined value, it is determined that the emergency brake operation has been executed. Such method, as mentioned above, can prevent an erroneous determination of emergency brake operation when, for instance, the brake is operated rapidly quite temporarily, or the brake is operated successively with a large pedal depression force during high speed driving.

Figure 2A:
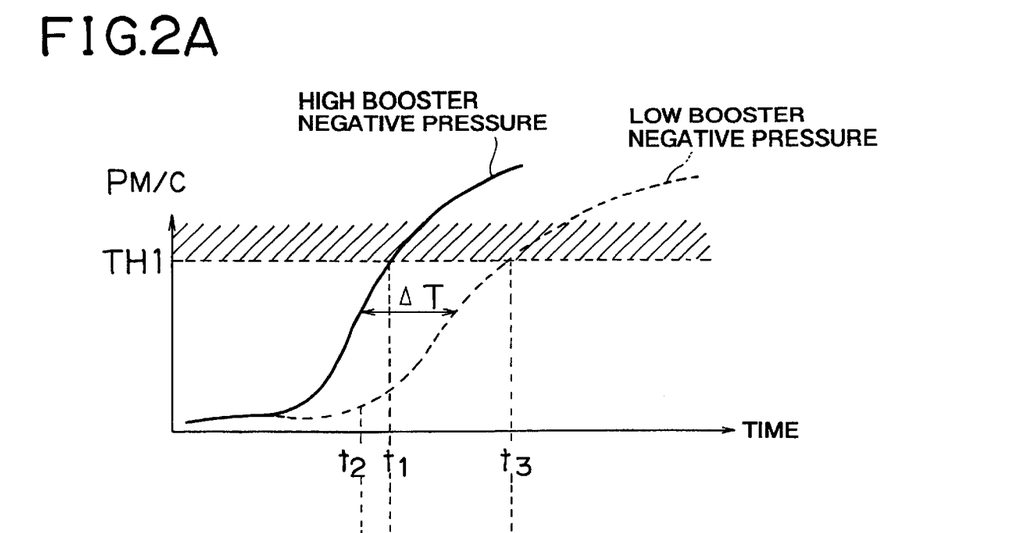
FIG. 2A shows a variation of master cylinder pressure $P_{M/C}$ when an emergency brake is operated for the case where sufficient (high) booster negative pressure is secured and for the case where the booster negative pressure is not sufficient (low)
Figure 2B:
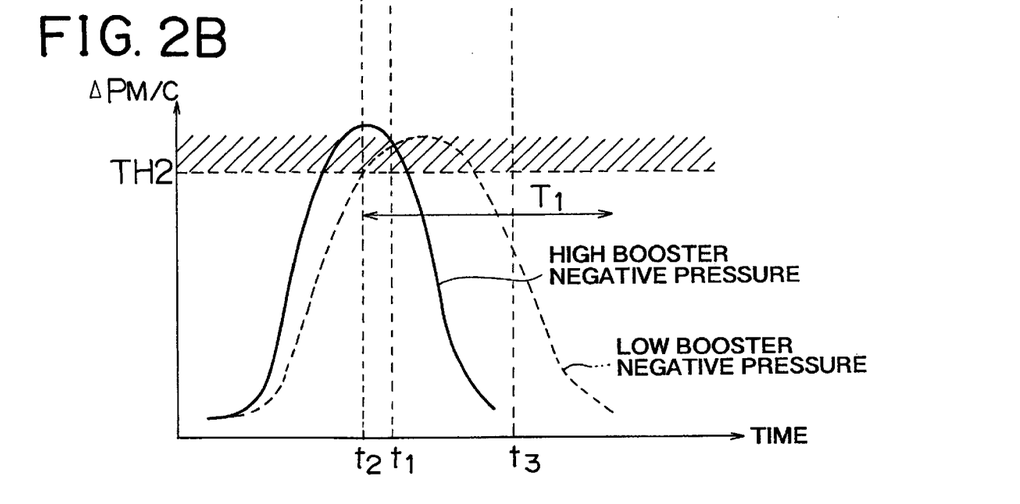
FIG. 2B shows a variation of master pressure gradient $\Delta P_{M/C}$ when the emergency brake is operated for the case where sufficient (high) booster negative pressure is secured and for the case where the booster negative pressure is not sufficient (low)

However, the brake booster 14 is a mechanism to assist the brake operation using, as a power source, the booster negative pressure supplied from the engine inlet pipe. Therefore, the booster negative pressure might drop due to the variation of inlet pipe negative pressure depending on the vehicle running state. In this case, the brake booster 14 does not assist sufficiently, and the start-up of master cylinder pressure $P_{M/C}$ is delayed when the emergency brake is operated, compared to the case where a large booster negative pressure is secured. Thus, under the low booster negative pressure condition, if it is assumed, as the determination condition of emergency brake operation, that the master cylinder pressure $P_{M/C}$ is equal to or greater than a predetermined value, and that the elevation gradient of the master cylinder pressure $P_{M/C}$ is equal to or greater than a predetermined value, even if the emergency brake operation is executed by the driver, it is not determined as an emergency brake operation, and the brake assist control is not executed. Now, the reason thereof will be described in detail referring to FIG. 2. Note that in this description, the booster negative pressure is expressed by the pressure difference with respect to the atmospheric pressure. Therefore, small (low) booster negative pressure means that the pressure difference between the atmospheric pressure is small, namely, the pressure is near the atmospheric pressure.

FIG. 2A shows the variation with time of master cylinder pressure $P_{M/C}$ when the emergency brake is operated. FIG. 2B shows the variation with time of the elevation gradient of master cylinder pressure $P_{M/C}$ (=$dP_{M/C}/dt$; master pressure gradient $\Delta P_{M/C}$ hereinafter) under the same condition as FIG. 2A, respectively. In FIG. 2A and FIG. 2B, the solid line indicates the case where sufficiently high booster negative pressure is provided, and the broken line indicates the case where a low booster negative pressure is provided.

As shown in FIG. 2A and FIG. 2B, supposing that the threshold value concerning the master cylinder pressure $P_{M/C}$ is TH1 and the threshold value concerning the master pressure gradient $\Delta P_{M/C}$ is TH2, the master cylinder pressure $P_{M/C}$ reaches the threshold value TH1 at the time t1 when a large booster negative pressure is secured (solid line), and at this time t1, the master pressure gradient ΔP/MC exceeds the threshold value TH2. Therefore, when a large enough booster negative pressure is secured, the emergency brake operation can be determined at the time t1 to start the brake assist control.

On the other hand, when the booster negative pressure is not sufficient (broken line), as shown in FIG. 2A, the start-up of the master cylinder pressure $P_{M/C}$ is delayed by $\Delta T$. As a consequence, when the master pressure gradient $\Delta P_{M/C}$ reaches the threshold value TH2 at the time t2, the master cylinder pressure $P_{M/C}$ has not yet reached the threshold value TH1. Moreover, when the master cylinder pressure $P_{M/C}$ reaches the threshold value TH1 at the time t3, the master pressure gradient $\Delta P_{M/C}$ is already less than the threshold value TH2. Thus, when the booster negative pressure is not sufficient, the condition "master cylinder pressure $P_{M/C}$>threshold value TH1, and master pressure gradient $\Delta P_{M/C}$>threshold value TH2" might not be established, even when emergency brake is operated. Therefore, if this condition is taken as a determination condition of emergency brake operation, in the case where the booster negative pressure is not sufficient, the brake assist control might not be started even when the emergency brake is operated.

As described above, when the booster negative pressure is not sufficient, the start-up of the master cylinder pressure $P_{M/C}$ is delayed compared to the case where a sufficient booster negative pressure is secured. However, as is apparent from FIG. 2A, once a certain time has elapsed after the start of the brake operation, the master cylinder pressure $P_{M/C}$ reaches approximately the same value as when a sufficient booster negative pressure is secured. On the other hand, as is apparent from FIG. 2B, the master pressure gradient $\Delta P_{M/C}$ starts with a relatively small delay after the start of the brake operation, even when the booster negative pressure is low.

Consequently, in this embodiment, the emergency brake operation is determined, in order to start the brake assist control, if the master cylinder pressure $P_{M/C}$ reaches the threshold value TH1 within a predetermined time T1 after the master pressure gradient $\Delta P_{M/C}$ exceeds the threshold value TH2. According to such a determination method, the emergency brake can be determined appropriately to start the BA control, even when the start-up of the master cylinder pressure $P_{M/C}$ has been delayed due to the decrease of the booster negative pressure.

Here, the threshold value TH2 is set to be the lower limit value of the master pressure gradient $\Delta P_{M/C}$ in the case where the emergency brake operation is executed to start the BA control under the condition where the booster negative pressure has dropped to its lower limit value (for example, 400 mmHg). The threshold value TH1 is set to be the lower limit value of the value that the master cylinder pressure $\Delta P_{M/C}$ reaches when the emergency brake operation is executed to start the BA control. The predetermined time T1 is set to be the upper limit value (for example, 100 to 150 msec) of the time that the master cylinder pressure $P_{M/C}$ reaches the threshold value TH1, after the master pressure gradient $\Delta P_{M/C}$ has become equal to or greater than the threshold value TH2, when the emergency brake operation is executed to start the BA control.

Figure 3:
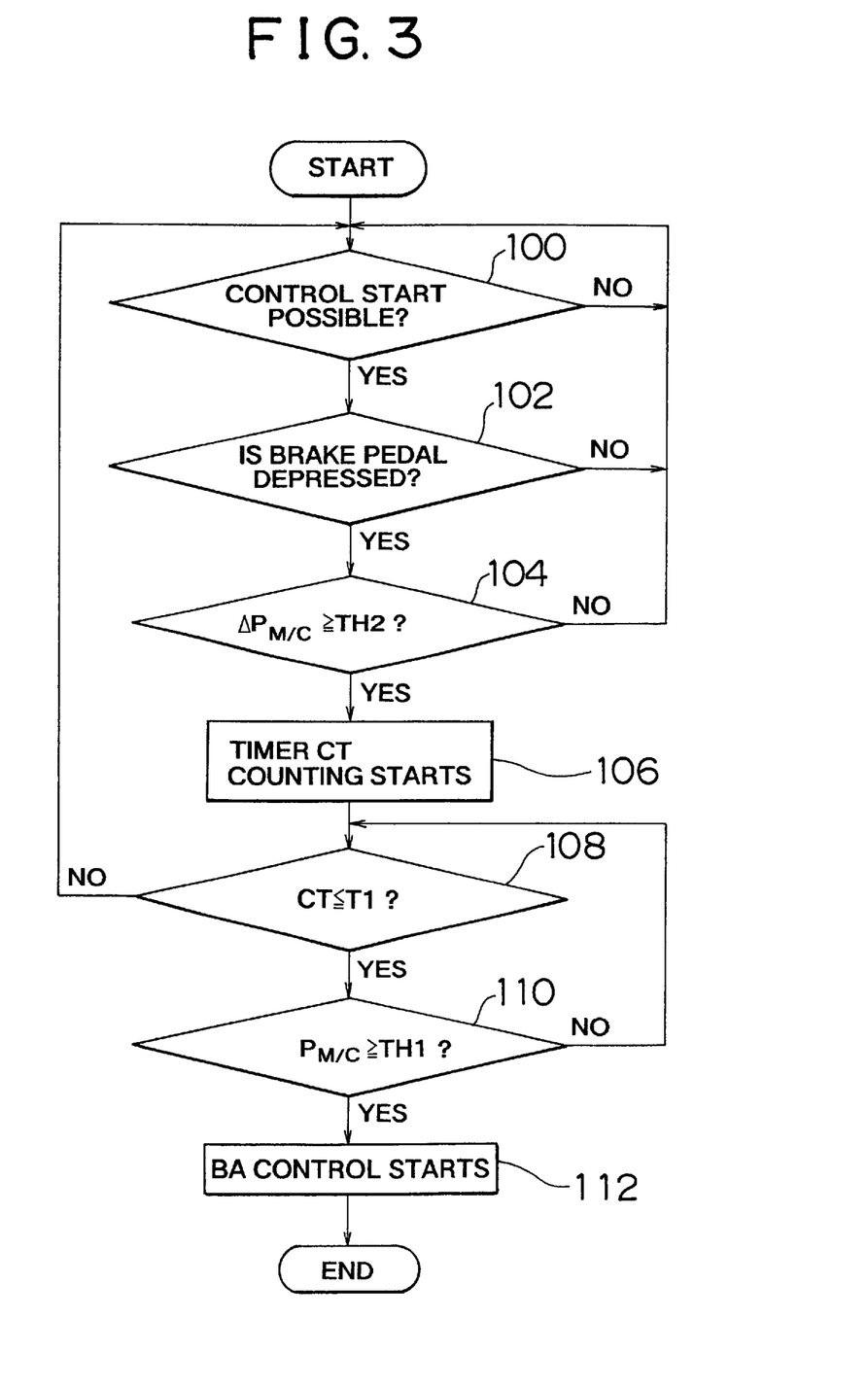
FIG. 3 is a flow chart of a routine to be executed by ECU 10 in this embodiment.

Now, the contents of the routine shown in FIG. 3 will be described. FIG. 3 is a flow chart showing the routine to be executed by the ECU 10 to start the brake assist control. When the routine shown in FIG. 3 is started, first the processing of step 100 is executed.

In step 100, it is determined if the brake assist control can be started or not (more concretely, for instance, if the pump 56, respective electromagnetic valves or the like can be operated normally or not). As a result, if the brake assist control can be started, then the processing of step 102 is executed. On the other hand, in step 100, if the brake assist control is not allowed to start, the processing of step 100 is executed again.

In step 102, it is determined if the brake pedal 12 is depressed. Such a determination can be performed, for example, based on the output signal of a stop lamp switch provided in the proximity of the brake pedal 12. Alternatively, the brake pedal 12 may be judged to be depressed if the master cylinder pressure $P_{M/C}$ exceeds a predetermined value. In step 102, if the brake pedal 12 is not depressed, the processing of step 100 is executed again. On the other hand, if the brake pedal 12 is depressed, then the processing of step 104 is executed.

In step 104, it is determined if the master pressure gradient $\Delta P_{M/C}$ is equal to or greater than the threshold value TH2. As a result, if $\Delta P_{M/C} \geq TH2$ is not established, the processing of step 100 is executed again. If $\Delta P_{M/C} \geq TH2$ is established (this occurs at time t2 shown in FIG. 2B), then the processing of step 106 is executed.

In step 106, the counting starts for monitoring the elapsed time after the master pressure gradient $\Delta P_{M/C}$ has become equal to or greater than the threshold value TH2. To be more specific, the ECU 10 has an integrated timer CT and, in step 106, this timer CT is reset to zero, and starts its counting operation.

In step 108 following the step 106, it is determined if the timer CT value is equal to or less than the predetermined time T1. As a result, if $CT \leq T1$ is established, then the processing of step 110 is executed.

In step 110, it is determined if the master cylinder pressure $P_{M/C}$ is equal to or greater than the threshold value TH1. As a result, if $P_{M/C} \geq TH1$ is established (this occurs at time t3 shown in FIG. 2A), it means that the master cylinder pressure $P_{M/C}$ has reached the threshold value TH1 after the master pressure gradient $\Delta P_{M/C}$ has become equal to or greater than the threshold value TH2. In this case, it is decided that the emergency brake operation has been executed and, next, in step 112, the processing to start the BA control, namely, the processing for realizing the BA state is executed, concluding this routine. On the other hand, in step 110, if $P_{M/C}$>TH1 is not established, the processing of step 108 will be executed again.

In step 108, if $CT \leq T1$ is not established, it means that the master cylinder pressure $P_{M/C}$ has not attained the threshold value T1 within the predetermined time T1, after the master pressure gradient $\Delta P_{M/C}$ has become equal to or greater than the threshold value TH2. In this case, the processing of step 100 will be executed again.

Figure 4:
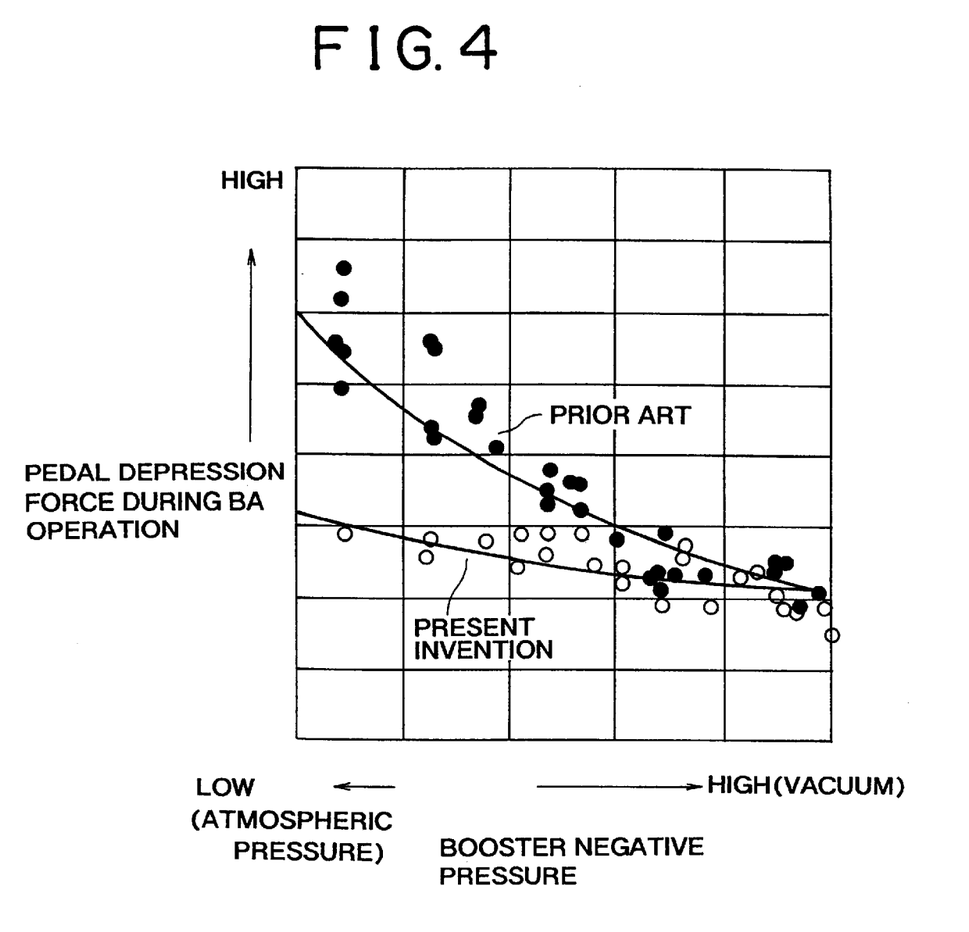
FIG. 4 shows the results of experimental measurement of the relationship between the booster negative pressure and the pedal depression force when break assist control begins in the case where the brake is operated with various braking force at a constant pedal actuation speed, for this embodiment and the conventional art.

FIG. 4 shows the results of experimental measurement of the relationship between the booster negative pressure and the pedal depression force when BA control begins in the case where the brake is operated with various pedal depression forces at a constant actuation speed. In FIG. 4, symbol O shows the measurement results of this embodiment, and symbol • shows the measurement results of the conventional art, wherein the condition for initiating the BA control is such that the master cylinder pressure $P_{M/C}$ and the master pressure gradient $\Delta P_{M/C}$ are both equal to or greater than the threshold value, respectively.

As shown by symbol • in FIG. 4, according to the determination method of the prior art, as the booster negative pressure drops (namely, becomes closer to atmospheric pressure), the pedal depression force required for starting the BA control increases, because the brake booster assists less. On the contrary, according to this embodiment, the pedal depression force required for starting the BA control is substantially constant regardless of the value of the booster negative pressure.

Thus, this embodiment allows for the start of the BA control with a constant pedal depression force, namely under a constant brake operation state, regardless of the magnitude of the booster negative pressure. Consequently, the braking force control device according to this embodiment, allows for the start of the BA control securely, when the emergency brake operation is executed, even if the booster negative pressure has lowered.

Moreover, the master cylinder pressure $P_{M/C}$ response characteristics to the brake operation are different according to brake systems specifications including not only the characteristics of the brake booster 14, but also the wheel cylinder size, oil consumption during the braking operation, or the like. Therefore, if the BA control is to be started when both the master cylinder pressure $P_{M/C}$ and the master pressure gradient $\Delta P_{M/C}$ simultaneously exceed the threshold value, as in the prior art, respective threshold values should be set for each model, according to the brake system specifications. On the contrary, as mentioned above, this embodiment allows for the start of the BA control with a constant brake operation state, regardless of the start-up variation of master cylinder pressure $P_{M/C}$, making it unnecessary to adjust respective threshold values TH1, TH2 for each model, according to the brake system specifications. Thus, this embodiment realizes a highly universal system responding to the variation of the brake system specifications.

In the aforementioned embodiment, it is determined if the emergency brake operation has been executed or not, that is, if the BA control can be started or not, based on the master cylinder pressure $P_{M/C}$ and the master pressure gradient $\Delta P_{M/C}$ ; however, the invention is not limited to this, but a similar determination can also be performed based on the brake pedal 12 stroke amount (brake pedal stroke) and the increase gradient thereof, or the pedal depression force applied to the brake pedal 12 and its increase gradient.

In other words, as the master cylinder pressure $P_{M/C}$ and the brake pedal stroke correspond each other one-to-one, the brake pedal stroke and the increase gradient thereof show the same variation as the master cylinder pressure $P_{M/C}$ and the master pressure gradient $\Delta P_{M/C}$ shown in FIG. 2A and FIG. 2B according to the magnitude of the booster negative pressure. Therefore, the same effect as the aforementioned embodiment can be obtained by replacing the master cylinder pressure $P_{M/C}$ and the master pressure gradient $\Delta P_{M/C}$ with the brake pedal stroke and the increase gradient thereof.

Moreover, the greater the booster negative pressure, the easier the brake pedal stroke increases (or the brake pedal 12 can be depressed more easily), and the reaction from the brake pedal is small when it is depressed until the master cylinder pressure $P_{M/C}$ becomes a constant hydraulic pressure. Consequently, if the pedal depression force is detected by a distortion gauge disposed on the brake pedal 12, the greater the booster negative pressure, the pedal depression force until the master cylinder pressure $P_{M/C}$ becomes a constant hydraulic pressure is detected with a smaller increase ratio. In this case, if the threshold values TH1, TH2 are set based on the brake pedal depression force and the increase gradient thereof in the case where a sufficient booster negative pressure is secured, the pedal depression force starts up immediately and the BA control is executed often unnecessarily frequently, when the booster negative pressure is not sufficient. On the other hand, if the threshold values TH1, TH2 are set based on the case where the booster negative pressure is not sufficient, the BA control may not be executed even if the emergency brake operation is initiated, when sufficient booster negative pressure is secured. Therefore, the BA control can be started with a constant brake operation state, regardless of the magnitude of the booster negative pressure, by setting the threshold values TH1, TH2 based on the case where the booster negative pressure is not sufficient, and, as in the aforementioned embodiment, by determining the emergency brake operation to exist when the increase gradient of the pedal depression force becomes equal to or greater than the threshold value TH2 within the predetermined time T1 after the pedal depression force has become equal to or greater than the threshold value TH1.

Moreover, as mentioned before, The response characteristics of the pedal depression force in respect of the brake operation permit a highly universal system to be provided for responding to the variation of brake specifications which differ according to the brake system specifications.

In the aforementioned embodiment, though it has been described about the case where the invention is applied to the system shown in FIG. 1, the invention is not limited to this, but it can be applied to any system having a brake system for assisting the brake operation by means of negative pressure. For instance, it is not limited to a system for realizing the BA control by means of brake fluid pressurized by a pump as in the aforementioned embodiment. Rather, it can also be applied to a system wherein a mechanism is provided to supply forcibly the brake booster variable pressure chamber with negative pressure, and the brake booster itself is provided with a function to realize the BA control by supplying forcibly the variable pressure chamber with negative pressure when the emergency brake is operated.

Note that, in the aforementioned embodiment, threshold value TH1 corresponds to "second predetermined value," threshold value TH2 corresponds to "first predetermined value", and the time period until a predetermined time passes after the master pressure gradient $\Delta P_{M/C}$ has become equal to or greater than the threshold value TH2 to "predetermined time period", respectively. Moreover, the ECU 10 (controller) performs the processing of steps 100 to 112.

However, as "predetermined time period", for instance, the time until a predetermined time passes from when $\Delta P_{M/C}$ has reached the peak value after the master pressure gradient $\Delta P_{M/C}$ has become equal to or greater than the threshold value TH2, or the time until $\Delta P_{M/C}$ will decrease to a predetermined value (<TH2) after the master pressure gradient $\Delta P_{M/C}$ has become equal to or greater than the threshold value TH2, may also be used.

In the illustrated embodiment, the controller (ECU 10) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowchart shown in FIG. 3 can be used as the controller. A distributed processing architecture can be used for maximum data/signal processing capability and speed.

While the invention has been described with reference to preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A braking force control device, comprising:
 a brake device that generates a braking force corresponding to a brake operation amount when a brake operation state is normal; and
 a controller that determines that the brake operation state is in a predetermined state if an elevation gradient of the brake operation amount becomes equal to or greater than a first predetermined value and, thereafter, said brake operation amount becomes equal to or greater than a second predetermined value within a predetermined time period regardless of whether or not the value of the elevation gradient becomes equal to or greater than the first predetermined value at a time when the brake operation amount becomes equal to or greater than the second predetermined value;
 the controller causing execution of brake assist control to generate a braking force larger than would be generated when the brake operation state is normal, when the brake operation state is determined to be in the predetermined state.

2. The braking force control device according to claim 1, wherein said brake operation amount is a master cylinder pressure.

3. The braking force control device according to claim 1, wherein said brake operation amount is a brake pedal stroke amount.

4. The braking force control device according to claim 1, wherein said brake operation amount is a pedal depression force.

5. The braking force control device according to claim 1, wherein said predetermined time period is a time period that starts when the elevation gradient of the brake operation amount becomes equal to or greater than said first predetermined value.

6. The braking force control device according to claim 1, wherein said predetermined time period is a time period that starts when the elevation gradient of the brake operation amount reaches a peak value after the elevation gradient of the brake operation amount became equal to or greater than the first predetermined value.

7. The braking force control device according to claim 1, wherein said predetermined time period is a time period that lasts when the elevation gradient of the brake operation amount drops to a third predetermined value smaller than the second predetermined value, after the elevation gradient of the brake operation amount became equal to or greater than the first predetermined value.

8. The braking force control device according to claim 1, wherein said predetermined state is an emergency brake operation state.

9. A braking force control method for a braking system that generates a braking force corresponding to a brake operation amount when a brake operation state is in a normal state, comprising the steps of:
 determining that the brake operation state is in a predetermined state if an elevation gradient of the brake operation amount becomes equal to or greater than a first predetermined value and, thereafter, said brake operation amount becomes equal to or greater than a second predetermined value within a predetermined time period regardless of whether or not the value of the elevation gradient becomes equal to or greater than the first predetermined value at a time when the brake operation amount becomes equal to or greater than the second predetermined value; and
 causing said braking system to execute brake assist control to generate a braking force larger than would be generated when the brake operation state is normal, when the brake operation state is determined to be in the predetermined state.

10. The braking force control method according to claim 9, wherein said brake operation amount is a master cylinder pressure.

11. The braking force control method according to claim 9, wherein said brake operation amount is a brake pedal stroke amount.

12. The braking force control method according to claim 9, wherein said brake operation amount is a pedal depression force.

13. The braking force control method according to claim 9, wherein said predetermined time period is a time period that starts when the elevation gradient of the brake operation amount becomes equal to or greater than said first predetermined value.

14. The braking force control method according to claim 9, wherein said predetermined time period is a time period that starts when the elevation gradient of the brake operation amount reaches a peak value after the elevation gradient of the brake operation amount became equal to or greater than the first predetermined value.

15. The braking force control method according to claim 9, wherein said predetermined time period is a time period that lasts when the elevation gradient of the brake operation amount drops to a third predetermined value smaller than the first predetermined value, after the elevation gradient of the brake operation amount became equal to or greater than the first predetermined value.

16. The braking force control method according to claim 9, wherein said predetermined state is an emergency brake operation state.

17. A braking force control device, comprising:
 a brake device that generates a braking force corresponding to a brake operation amount when a brake operation state is normal; and
 a controller that causes execution of brake assist control to generate a braking force larger than would be generated when the brake operation state is normal, said controller starting the brake assist control at a substantially constant brake pedal force regardless of a value of a booster negative pressure that is supplied to the brake device.

18. A braking force control method for a braking system that generates a braking force corresponding to a brake operation amount when a brake operation state is in a normal state, comprising the steps of:
 determining that the brake operation state is in a predetermined state that requires brake assist control; and
 causing said braking system to execute said brake assist control to generate a braking force larger than would be generated when the brake operation state is normal, said brake assist control being initiated at a substantially constant brake pedal force regardless of a value of a booster negative pressure that is supplied to the braking system.

* * * * *